United States Patent
Rogers et al.

(10) Patent No.: US 10,959,549 B2
(45) Date of Patent: Mar. 30, 2021

(54) BLANKET

(71) Applicant: YETI Coolers, LLC, Austin, TX (US)

(72) Inventors: Kyle Edward Rogers, Austin, TX (US); John W. Dow, Austin, TX (US); Donald Edward Desroches, Austin, TX (US); Erin K. Ellison, Austin, TX (US); Derek Sullivan, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 209 days.

(21) Appl. No.: 16/053,024

(22) Filed: Aug. 2, 2018

(65) Prior Publication Data

US 2020/0037792 A1    Feb. 6, 2020

(51) Int. Cl.

| | |
|---|---|
| *A47G 9/06* | (2006.01) |
| *A47G 9/02* | (2006.01) |
| *A47G 9/04* | (2006.01) |
| *B32B 3/06* | (2006.01) |
| *B32B 5/06* | (2006.01) |
| *B32B 7/14* | (2006.01) |
| *B32B 37/12* | (2006.01) |
| *D05B 93/00* | (2006.01) |
| *B32B 38/00* | (2006.01) |

(52) U.S. Cl.
CPC .......... *A47G 9/062* (2013.01); *A47G 9/0223* (2013.01); *A47G 9/04* (2013.01); *B32B 3/06* (2013.01); *B32B 5/06* (2013.01); *B32B 7/14* (2013.01); *B32B 37/12* (2013.01); *D05B 93/00* (2013.01); *B32B 2038/008* (2013.01); *D10B 2503/06* (2013.01)

(58) Field of Classification Search
CPC ...... A47G 9/0207; A47G 9/0223; A47G 9/04; A47G 9/06; A47G 9/062; B32B 3/06; B32B 5/06; B32B 7/14; B32B 37/12; B32B 2038/008; D05B 93/00; D10B 2503/06

See application file for complete search history.

(56) References Cited

U.S. PATENT DOCUMENTS

| | | | |
|---|---|---|---|
| 3,463,690 A | | 8/1969 | Converse et al. |
| 3,541,620 A | * | 11/1970 | Chapuis ........... A47G 9/086 5/413 R |

(Continued)

FOREIGN PATENT DOCUMENTS

| | | |
|---|---|---|
| CN | 202359672 U | 8/2012 |
| CN | 302828566 | 5/2014 |

(Continued)

OTHER PUBLICATIONS

Nov. 4, 2019—(WO) ISR and WO—App. No. PCT/US2019/044701.

(Continued)

*Primary Examiner* — David R Hare
(74) *Attorney, Agent, or Firm* — Banner & Witcoff, Ltd.

(57) ABSTRACT

A blanket formed from multiple layers including a fabric layer on the top and a base layer on the bottom where the base layer may include a waterproof coating on at least one side. The blanket may also include an insulation layer and an adhesive scrim layer positioned between the fabric layer and the base layer. The layers of the blanket may be attached using a combination of stitching along with an adhesive to form a blanket that is waterproof and is secured together such that the fabric layer does not move relative to the base layer.

20 Claims, 9 Drawing Sheets

(56) References Cited

U.S. PATENT DOCUMENTS

| | | |
|---|---|---|
| D250,494 S | 12/1978 | Householder |
| 4,278,719 A | 7/1981 | Samecki |
| 4,499,133 A | 2/1985 | Prince |
| 4,654,906 A | 4/1987 | Roberts |
| 4,703,528 A | 11/1987 | Rolle |
| D322,532 S | 12/1991 | Kumar et al. |
| 5,072,467 A | 12/1991 | Hunt |
| 5,141,200 A | 8/1992 | Sherman et al. |
| D339,496 S | 9/1993 | Corcoran |
| 5,386,603 A | 2/1995 | Drust |
| 5,406,659 A | 4/1995 | Camp |
| 5,408,712 A | 4/1995 | Brun |
| 5,414,881 A | 5/1995 | Terrazas |
| 5,427,834 A | 6/1995 | Sodetz |
| 5,443,880 A | 8/1995 | Wike |
| D362,363 S | 9/1995 | Friedman |
| 5,520,364 A | 5/1996 | Bloxson et al. |
| D378,483 S | 3/1997 | Kiefer |
| D379,129 S | 5/1997 | Yost et al. |
| 5,666,678 A | 9/1997 | Wall |
| D388,273 S | 12/1997 | Propper |
| D389,362 S | 1/1998 | Boulatian |
| D392,146 S | 3/1998 | Gregg |
| 5,740,566 A | 4/1998 | Stacy |
| 5,740,567 A | 4/1998 | Mitchell |
| 5,758,373 A | 6/1998 | Bloetjes |
| D412,422 S | 8/1999 | Cobb |
| 6,192,536 B1 | 2/2001 | Connors |
| 6,223,367 B1 | 5/2001 | French et al. |
| 6,260,219 B1 | 7/2001 | Bartosik |
| 6,393,638 B1 | 5/2002 | MacColl |
| 6,502,257 B1 | 1/2003 | Glenn |
| 6,618,881 B2 * | 9/2003 | Hart ................. A47G 9/0207 5/482 |
| 6,631,527 B2 | 10/2003 | Hyduk |
| 6,721,973 B1 | 4/2004 | Cristiano |
| 6,805,076 B2 | 10/2004 | Duffy et al. |
| 6,838,398 B2 * | 1/2005 | Repp .................. B32B 5/26 442/59 |
| 6,839,921 B2 | 1/2005 | Cloutier et al. |
| 7,111,345 B1 | 9/2006 | Hui |
| D538,095 S | 3/2007 | Turner |
| D546,612 S | 7/2007 | Makin |
| D551,891 S | 10/2007 | Kaiser et al. |
| D580,204 S | 11/2008 | Yeargin |
| D589,735 S | 4/2009 | Kaiser et al. |
| D591,999 S | 5/2009 | Yeargin |
| 7,559,290 B2 | 7/2009 | West |
| 7,607,182 B1 | 10/2009 | Weiner |
| D603,583 S | 11/2009 | Wood |
| 7,614,100 B1 | 11/2009 | Barrington et al. |
| D620,741 S | 8/2010 | Pride-Darrington et al. |
| 7,886,378 B2 * | 2/2011 | Cheskis ............. B32B 3/08 5/484 |
| D637,441 S | 5/2011 | Edmunds |
| 8,011,042 B1 | 9/2011 | Rose et al. |
| D650,539 S | 12/2011 | Caprarola |
| 8,108,949 B2 * | 2/2012 | Iwashita ............. A41D 31/102 2/272 |
| 8,122,538 B2 | 2/2012 | McBrearty |
| D657,179 S | 4/2012 | Cupples et al. |
| 8,146,183 B2 | 4/2012 | Nirmel |
| D658,917 S | 5/2012 | Harris et al. |
| D660,070 S | 5/2012 | Lugo |
| D683,566 S | 6/2013 | Schwartz |
| D688,900 S | 9/2013 | McBrearty |
| D702,060 S | 4/2014 | Harris |
| D702,072 S | 4/2014 | Neff et al. |
| 8,689,711 B1 * | 4/2014 | Grover ............. D05B 11/00 112/475.08 |
| D707,466 S | 6/2014 | Lancaster |
| D708,867 S | 7/2014 | Rajusth |
| D710,131 S | 8/2014 | McNett et al. |
| D712,684 S | 9/2014 | Shiheiber |
| D715,519 S | 10/2014 | Dodd |
| D724,351 S | 3/2015 | Harris |
| D733,463 S | 7/2015 | Ruffin |
| 9,102,127 B2 | 8/2015 | Berkowitz et al. |
| D738,138 S | 9/2015 | Jackson |
| D740,590 S | 10/2015 | Obrentz |
| 9,279,270 B1 | 3/2016 | Treister |
| 9,492,023 B2 | 11/2016 | Paulat |
| D785,370 S | 5/2017 | Randall |
| 9,756,882 B2 | 9/2017 | Townsend |
| 9,763,485 B1 | 9/2017 | Weitala |
| D807,667 S | 1/2018 | Cooper |
| D809,216 S | 1/2018 | French |
| 9,861,143 B2 | 1/2018 | Townsend |
| 9,873,963 B2 | 1/2018 | Scorgie |
| D811,125 S | 2/2018 | Thornam |
| 9,902,125 B2 | 2/2018 | Dandapure et al. |
| D821,782 S | 7/2018 | Turlick |
| D826,598 S | 8/2018 | Thomas et al. |
| D828,703 S | 9/2018 | Alley |
| D831,384 S | 10/2018 | O'Neill |
| D838,515 S | 1/2019 | Lowchareonkul |
| D840,176 S | 2/2019 | Wills |
| D878,109 S * | 3/2020 | Rogers ................ A47G 9/086 D6/603 |
| 2002/0083525 A1 | 7/2002 | Zheng |
| 2002/0095725 A1 * | 7/2002 | Dix .................... A47G 9/0223 5/482 |
| 2003/0061659 A1 | 4/2003 | Dunlap et al. |
| 2005/0005355 A1 | 1/2005 | Marks et al. |
| 2005/0039261 A1 | 2/2005 | Corral |
| 2006/0090975 A1 | 5/2006 | Brock et al. |
| 2007/0017027 A1 | 1/2007 | Bowman et al. |
| 2008/0127414 A1 | 6/2008 | Allen |
| 2010/0089958 A1 | 4/2010 | Flagel et al. |
| 2011/0192419 A1 * | 8/2011 | Davis ................ B32B 25/045 134/6 |
| 2011/0258749 A1 | 10/2011 | Hibbs |
| 2012/0240336 A1 | 9/2012 | Dandapure et al. |
| 2012/0284917 A1 * | 11/2012 | Nirmel ............... A47G 11/003 5/417 |
| 2013/0177731 A1 | 7/2013 | Moriarty |
| 2013/0318711 A1 | 12/2013 | Benz |
| 2013/0326810 A1 | 12/2013 | Davidson |
| 2015/0013065 A1 | 1/2015 | Ketcham |
| 2015/0026884 A1 | 1/2015 | Brown |
| 2015/0143632 A1 | 5/2015 | Obrentz |
| 2016/0229151 A1 * | 8/2016 | Eberts ................ B32B 25/10 |
| 2016/0242539 A1 | 8/2016 | Paya |
| 2016/0325930 A1 | 11/2016 | Allsop |
| 2016/0353816 A1 | 12/2016 | Strace |
| 2018/0213952 A1 | 8/2018 | Penn et al. |
| 2019/0090666 A1 | 3/2019 | Bishop |

FOREIGN PATENT DOCUMENTS

| | | |
|---|---|---|
| CN | 204105546 U | 1/2015 |
| CN | 106108354 A | 11/2016 |
| EM | 000995691-0001 | 9/2008 |
| EM | 001863168-0001 | 5/2011 |
| EM | 001863168-0002 | 5/2011 |
| EM | 001863168-0003 | 5/2011 |
| EM | 002610337-0001 | 2/2015 |
| EM | 002631614-0009 | 2/2015 |
| EM | 003378371-0002 | 9/2016 |
| EP | 2355678 A2 | 8/2011 |
| EP | 2457471 A1 | 5/2012 |
| JP | 2005-287563 A | 10/2005 |
| JP | 2008-93159 A | 4/2008 |
| JP | 3161257 U | 7/2010 |
| JP | 3194691 U | 12/2014 |
| JP | 1597703 S | 2/2018 |

OTHER PUBLICATIONS

Yeti Lowlands Blanket: earliest review: Aug. 2018. [online], [site visited Feb. 16, 2017]. Available from Internet, https://www.yeti.com/en_US/more-gear/lowlands-blanket/YLOWB.html (Year: 2018).

(56) References Cited

OTHER PUBLICATIONS

Bed Life Decision catalog 2009-2010. p. 34 (JPO design prior art reference No. HC21011136).
Website: amazon.com, "Beach Blanket with Accessories: Nylon Tote Pouch 4 Stakes / Pegs" visited Oct. 20, 2017 at https://www.amazon.com/Beach-Blanket-Accessories-Outdoor-Oversized/dp/BOOKWZ9K1S.
Website: amazon.com, "Plus Oversized Waterproof Sand Free Beach Mat—Outdoor Beach / Picnic Blanket Fit" visited Oct. 20, 2017 at https://www.amazon.com/dp/B074137V41?psc=1.
Website: amazon.com, "Festival Blanket 55" × 59—Outdoor Camping Blanket" visited Oct. 20, 2017 at https://www.amazon.com/dp/B072LVFRT6?psc=1.
Website: amazon.com, "Easy and Personal Baby Gift Idea—Ribbon Blankets" visited Oct. 20, 2017 at http://fullofgreatideas.blogspot.com/2011/01/easy-personal-and-easy-baby-gift-idea.html.
Website: amazon.com, "Evergreen Outdoor Blanket—Waterproof" visited Oct. 20, 2017 at https://www.amazon.com/Evergreen-Outdoor-Blanket-Waterproof-Activities/dp/B073VCFG1S/ref=sr_1_1_sspa?ie=UTF8&qid=1508510350&sr=8-1-spons&keywords=waterproof+picnic+blanket&psc=1.
Website: amazon.com, "Astray Co. outdoor Picnic Blanket 55" × 70"—Compact Blanket" visited Oct. 20, 2017 at https://www.amazon.com/Astray-Co-Outdoor-Waterproof-Festivals/dp/B071J2FLLJ/ref=sr_1_26?s=sporting-goods&ie=UTF8&qid=1508510457&sr=1-26&keywords=waterproof+picnic+blanket+with+corner+loop.
Website: amazon.com, "Oversized Sand Proof Beach Blanket—Lightweight 7' × 9'—Family Size" visited Oct. 20, 2017 at https://www.amazon.com/dp/B073ZJFDV9/ref=dp_sp_detail?psc=1.

\* cited by examiner

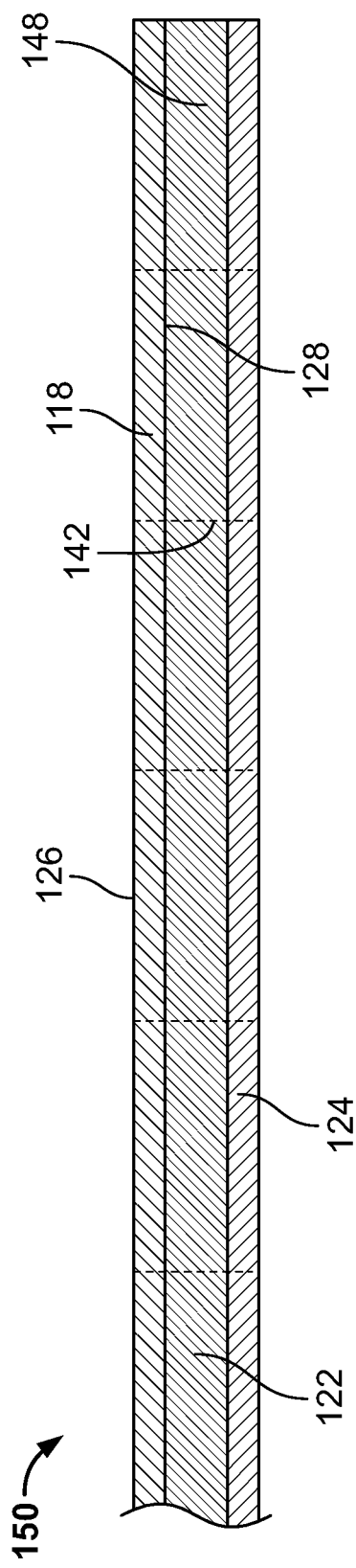
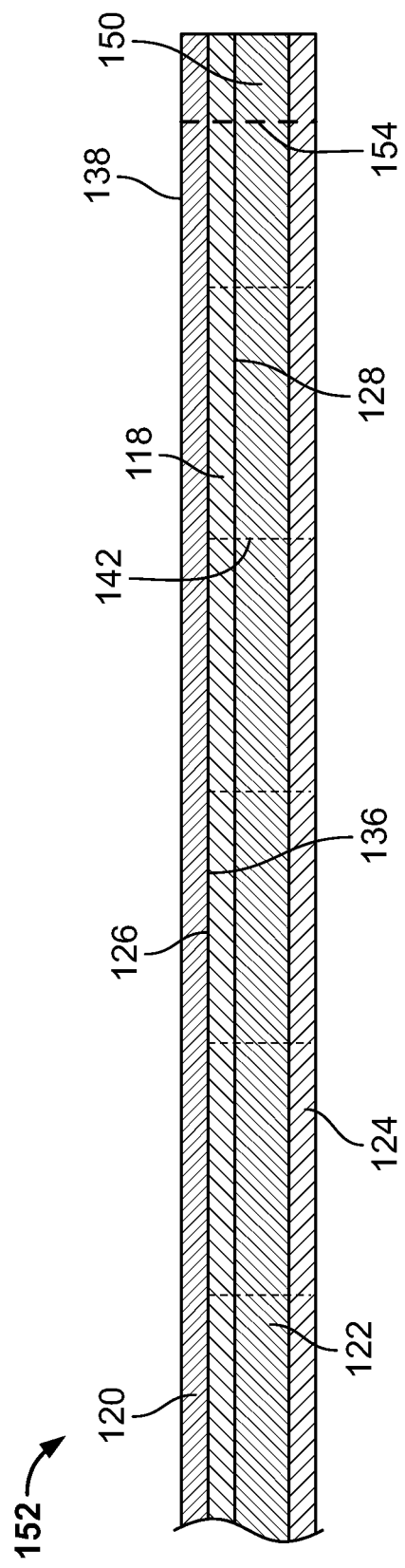
FIG. 9A
FIG. 9B

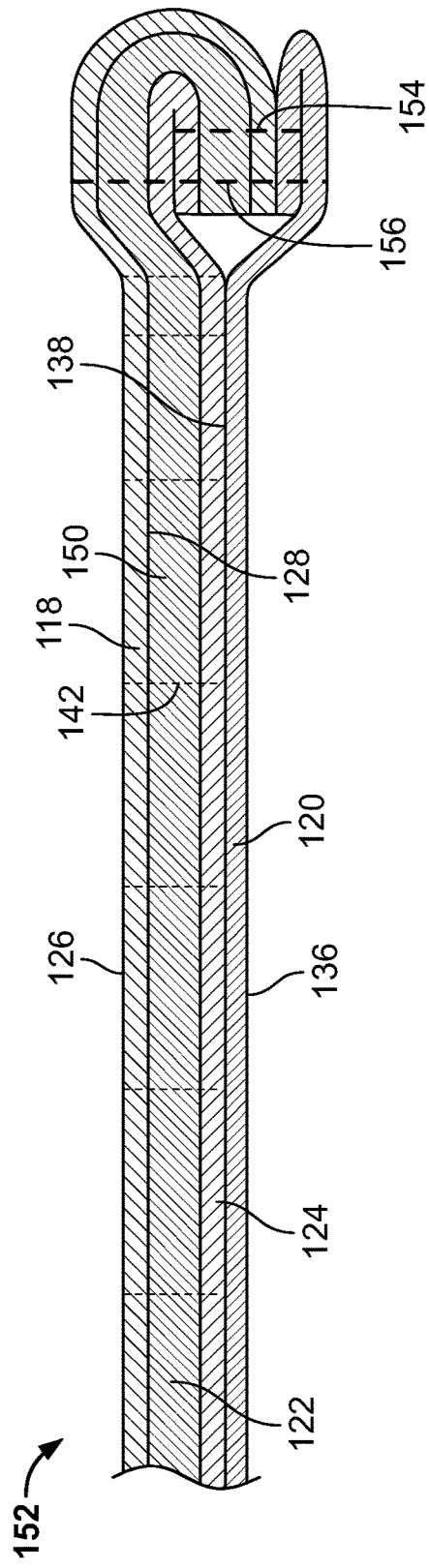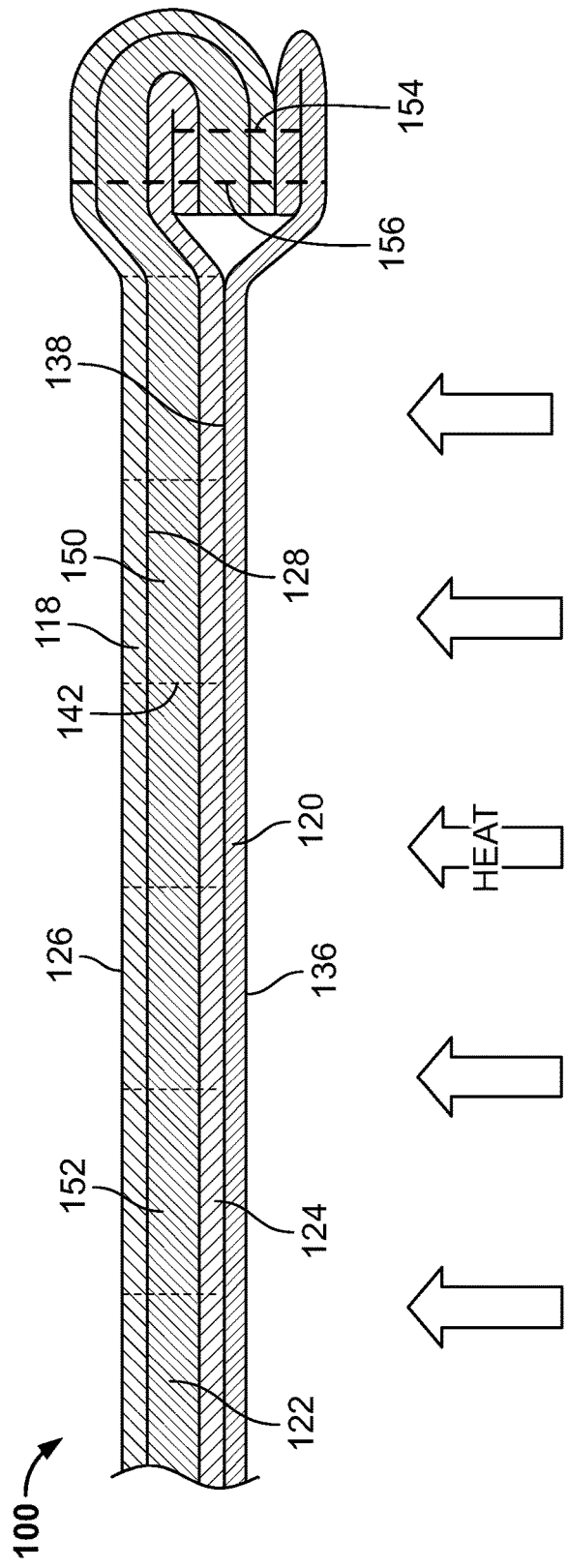

BLANKET

TECHNICAL FIELD

This disclosure generally relates to blankets having a waterproof layer.

BACKGROUND

Blankets have a variety of uses, such as being used in bedding, picnics, and in stadiums at sporting events. In general, they are used to keep people warm or protect them from the elements. The use of waterproof blankets not only helps to keep warm, but also offers an extra level of protection from moisture. However, sometimes waterproof blankets can be uncomfortable and sometimes do not provide a sufficient moisture barrier. In addition, blankets formed from a layered construction may separate such that the bottom layer may move relative to the top layer, which can cause the blanket to be uncomfortable as well as lead to durability issues from the relative movement. A blanket that is both waterproof and resists relative movement between the layers may be desirable.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Some aspects of this disclosure may relate to a blanket comprising a fabric layer having a top edge, a bottom edge opposite the top edge, a left edge extending from the top edge to the bottom edge and a right edge extending from the top edge to the bottom edge opposite the left edge, a base layer comprising a waterproof layer connected the fabric layer, a plurality of corner utility loops where a first end of each corner utility loop is attached to the fabric layer at a first edge and a second end of each corner utility loop is attached to the fabric layer at a second edge adjacent the first edge, and at least one side utility loop attached to the fabric layer on at least one side. The base layer may have the waterproof coating on a first side of the base layer, where the first side of the base layer is oriented towards the fabric layer. The blanket may also include an insulation layer and an adhesive scrim layer positioned between the fabric layer and the base layer. In addition, a stitched layered member may be formed by stitching together the insulation layer and the adhesive scrim layer to the fabric layer using a quilted pattern, where the quilted pattern may be arranged in a diamond pattern. The base layer may be attached to the stitched layered member by an adhesive, and may also further be attached to the stitched layered member using a first stitching near a perimeter edge of the blanket, where the first stitching extends through the stitched layered member once and the base layer once. The base layer may be further attached to the stitched layered member using a second stitching near the perimeter edge of the blanket, where the second stitching extends through the stitched layered member twice and also extends through the base layer twice, where the second stitching is spaced further inward from the perimeter edge of the blanket than the first stitching.

Still other aspects of this disclosure may relate to a blanket having at least one corner utility loop of the plurality of corner utility loops being attached between a folded portion of the fabric layer and a folded portion of the base layer, and where the at least one corner utility loop of the plurality of corner utility loops may extend equal to or less than 50 mm from a corner of the base layer. The blanket may have a peel strength within a range of 4 kilograms-force and 7 kilograms-force as determined by a peel strength test method, where the peel strength test method comprises an upper jaw of a tensile test machine moving away from a lower jaw of the tensile test machine at a rate of 100 millimeters per minute. Also, the blanket may have a waterproof rating within a range of 20,000 mm and 40,000 mm column pressure when tested with a hydrostatic test. The blanket may also have an interlayer strength within a range of 42 kilograms-force and 46 kilograms-force as determined by an interlayer strength test method, where the interlayer strength test method comprises an upper jaw of a tensile test machine moving away from a lower jaw of the tensile test machine at a rate of 100 millimeters per minute.

Yet other aspects of this disclosure may relate to a method of forming a blanket comprising placing a fabric layer onto an insulation layer and an adhesive mesh scrim layer underneath the insulation layer; stitching together the fabric layer, the insulation layer, and the adhesive mesh scrim layer to form a stitched layered member, where the stitched layered member is stitched together across an entire surface using a quilted pattern; placing a base layer onto the fabric layer, where the base layer has a first side having a waterproof coating and a second side opposite the first side, and where the first side the waterproof coating is facing an exterior surface of the fabric layer. The method may further comprise stitching together the base layer to the stitched layered member using a first stitching along at least three perimeter edges of the base layer to form a blanket sub-assembly; turning the blanket sub-assembly such that the exterior surface of the fabric layer is exposed and the second side of the base layer is exposed, laminating the blanket sub-assembly to adhere the first side of the base layer to the adhesive mesh scrim layer. Laminating the blanket sub-assembly may comprise applying heat and pressure. The method may still further comprise placing at least one utility loop between the stitched layered member and the base layer and stitching the at least one utility loop to the stitched layered member and the base layer. The method may also include comprising a step of folding a portion of the stitched layered member inward to form a folded portion of the stitched layered member and folding a portion of the base layer inward to form folded portion of the base layer, and then stitching the folded portion of the stitched layered member to the folded portion of the base layer with a second stitching, wherein the second stitching is positioned inward of the first stitching. Additionally, the adhesive mesh scrim layer may comprise a polyester material and a polyolefin based adhesive.

BRIEF DESCRIPTION OF THE DRAWINGS

The present invention is illustrated by way of example and not limited in the accompanying figures in which like reference numerals indicate similar elements and in which:

FIGS. 9A-9D are partial cross-sectional views of the manufacturing process of the blanket of FIG. 1 according to one or more aspects described herein.

Figure 1:
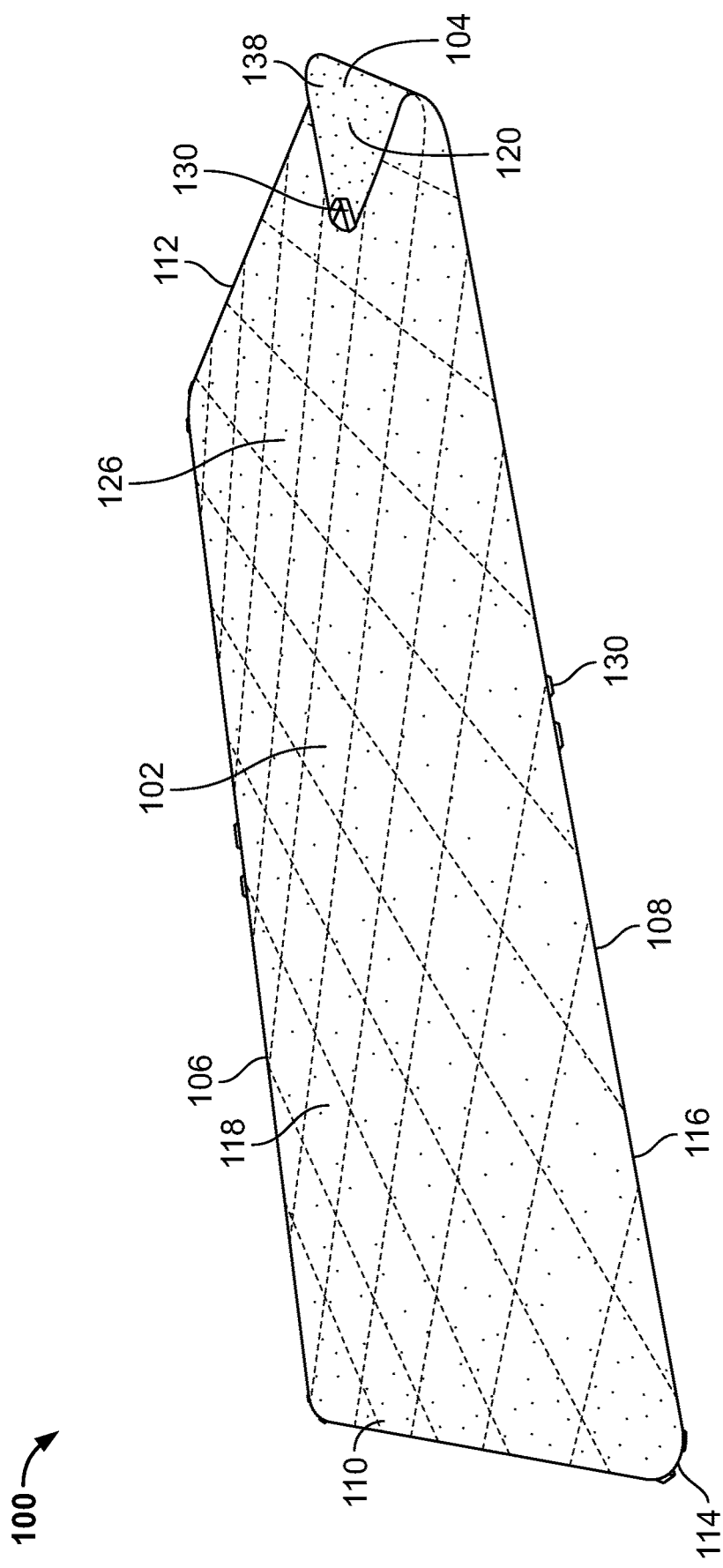
FIG. 1 is a top perspective view of a blanket according to one or more aspects described herein.
Figure 2:
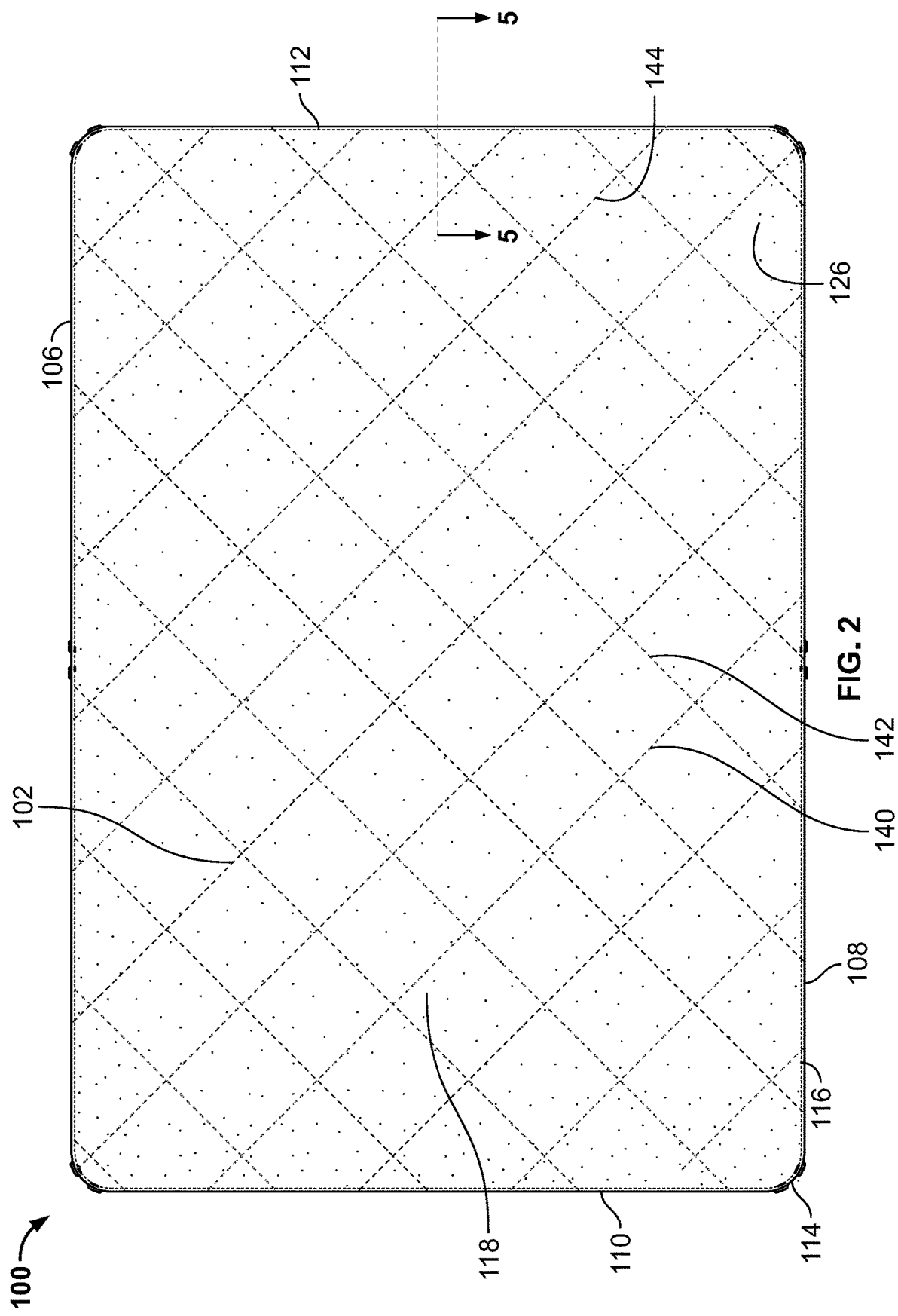
FIG. 2 is a top view of the blanket of FIG. 1 according to one or more aspects described herein.
Figure 3:
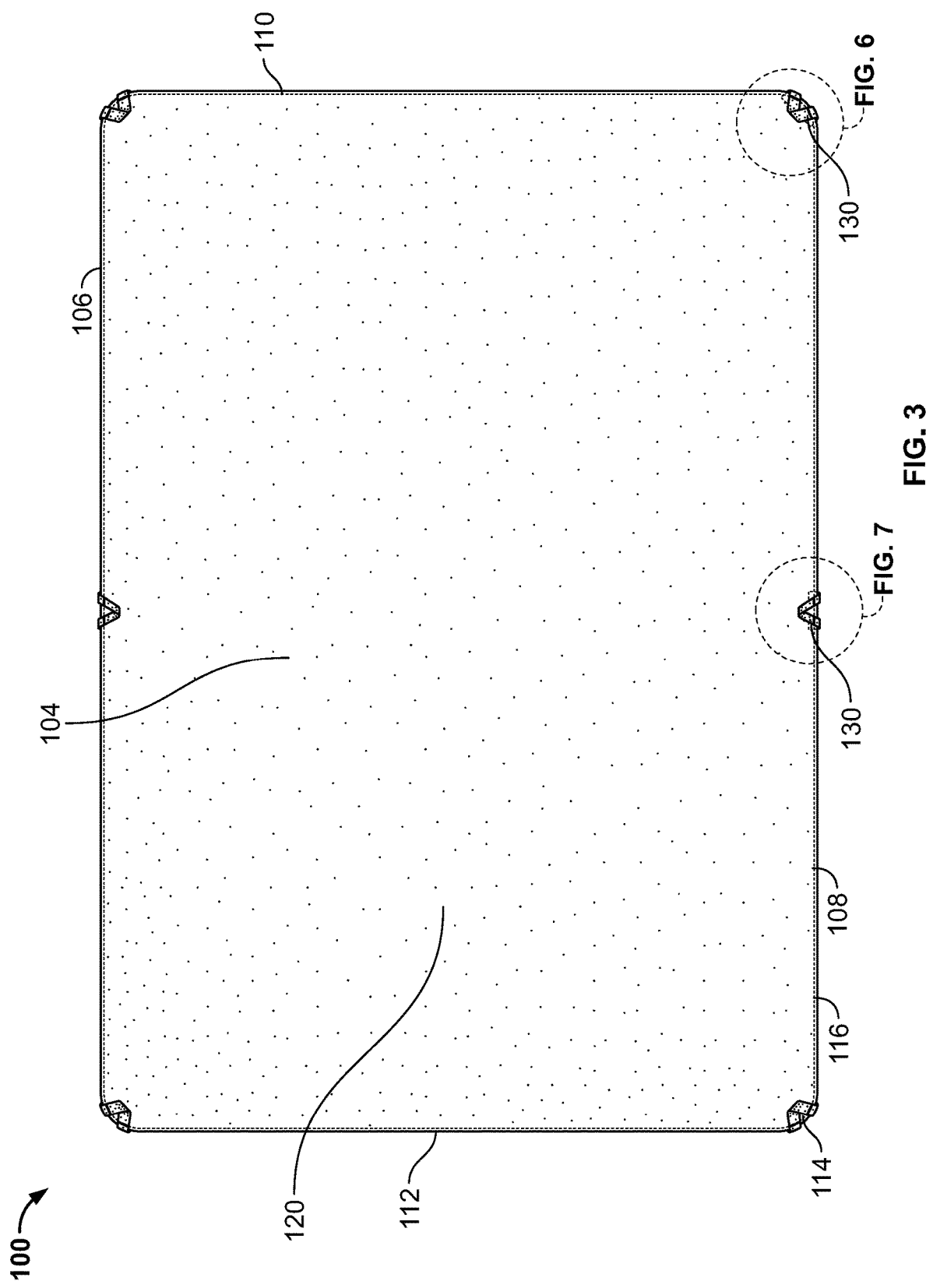
FIG. 3 is a bottom view of the blanket of FIG. 1 according to one or more aspects described herein.
Figure 4:
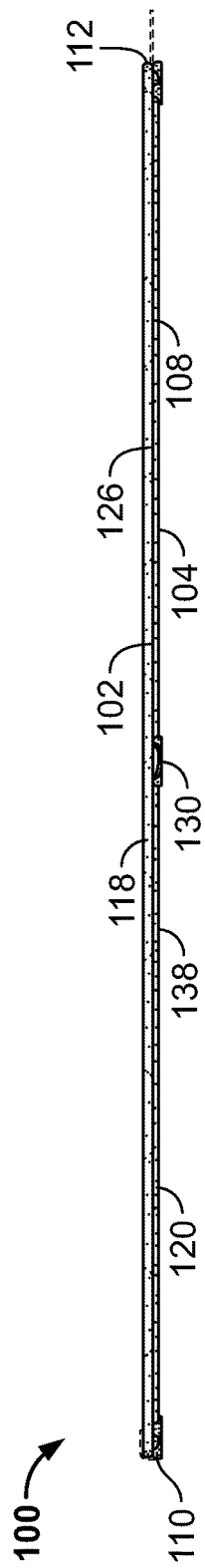
FIG. 4 is a front view of the blanket of FIG. 1 according to one or more aspects described herein.

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention.

In general, aspects of this disclosure relate to a blanket, in particular a blanket 100 with at least one waterproof layer. The blanket 100 may have a top surface 102, a bottom surface 104, along with a top edge 106, a bottom edge 108 opposite the top edge 106, a left edge 110 extending from the top edge 106 to the bottom edge 108 and a right edge 112 extending from the top edge 106 to the bottom edge 108 opposite the left edge 110. In addition, corner edges 114 may connect the adjacent edges. As shown in the exemplary embodiment in FIGS. 1-8, the corner edges 114 may comprise curved edges while alternatively, the corner edges 114 could be straight lines that give the appearance of chamfered corners, or as another option, the plurality of edges 106, 108, 110, 112 may extend and contact one another without a corner edge. These edges 106, 108, 110, 112 along with the optional corner edges 114 may form the perimeter edges 116 of the blanket 100.

Figure 5:
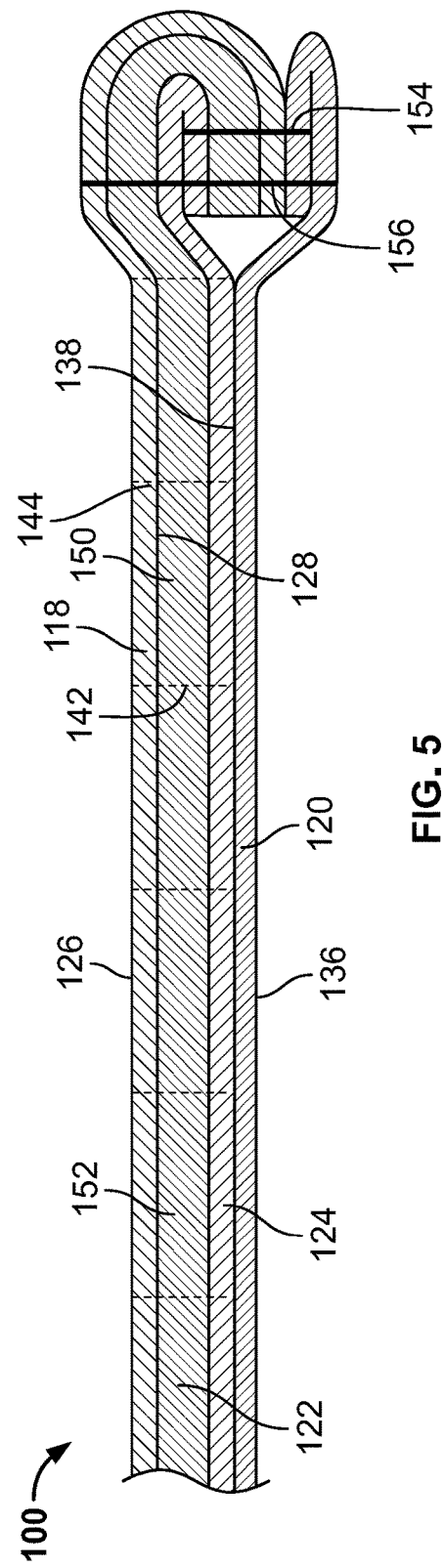
FIG. 5 is a partial view of a cross-section of the blanket of FIG. 2 according to one or more aspects described herein.
Figure 6:
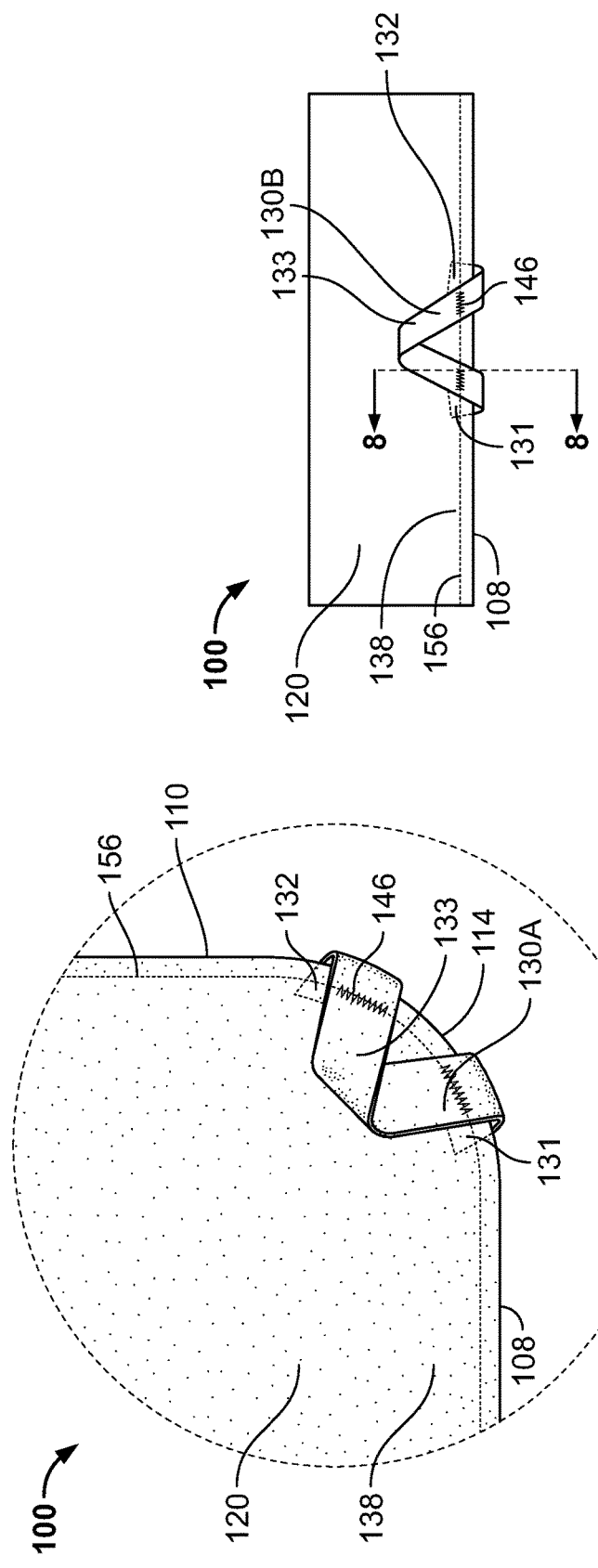
FIG. 6 is a partial view of the blanket of FIG. 3 according to one or more aspects described herein.
Figure 7:
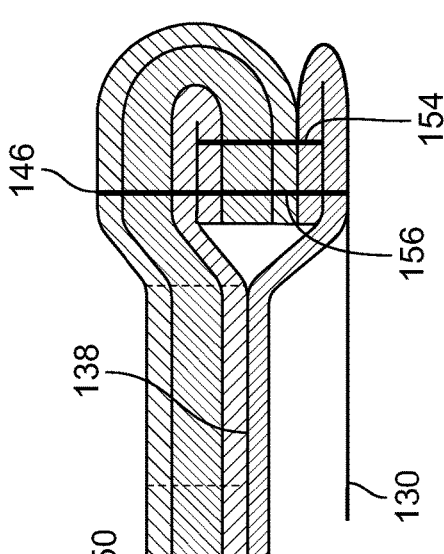
FIG. 7 is a partial view of the blanket of FIG. 3 according to one or more aspects described herein.

The blanket 100 may comprise a plurality of layers such that it may comprise a fabric layer 118, a base layer 120, an insulation layer 122 and an adhesive scrim layer 124. The edges of the fabric layer 118 may have edges that are consistent with the edges 106, 108, 110, 112, 114 of the blanket 100 that may be formed along a fold or crease of fabric layer 118 of the blanket 100. The plurality of layers may be arranged in a manner that the fabric layer 118 is positioned as the top layer with the base layer 120 positioned as the bottom layer with the insulation layer 122 and adhesive scrim layer 124 positioned between the fabric layer 118 and the base layer 120. More specifically, as shown in FIG. 5, the fabric layer 118 may be adjacent to or on top of the insulation layer 122, the adhesive scrim layer 124 may be between the insulation layer 122 and the base layer 120, and the base layer 120 may be the bottom layer. The base layer 120 may have a first side having a waterproof coating and a second side opposite the first side. The first side 136 of the base layer 120 may be oriented as the interior surface of the base layer 120 such that the first side 136 that includes the waterproof coating is oriented to face towards the fabric layer 118 and the second side 138 arranged as the exterior surface. The fabric layer 118 may have an exterior surface 126 that is exposed and an interior surface 128 that is in contact with the insulation layer 122. Each of the layers 118, 120, 122, 124 may be the same size when viewed from a top view with each layer having the same surface area.

The fabric layer 118, the insulation layer 122, and the adhesive scrim layer 124 may be stitched together across the entire surface of blanket with a quilted pattern 140 to form a stitched layered member 150. For example, as shown in the exemplary embodiment of FIGS. 1-8, the quilted pattern 140 may be formed by the rows of stitching 142, 144 being arranged as a plurality of diamond shapes extending across the exterior surface 126 of the fabric layer 118. The quilted pattern 140 may have a first set of multiple rows of parallel stitching 142 oriented at an angle to the top edge 106 and positioned approximately 8 inches (approximately 203 mm) apart or within a range of 6 inches (154 mm) and 10 inches (254 mm) and a second set of multiple rows of similarly spaced parallel stitching 144 oriented at an angle, preferably a right angle, to the first set of stitching 142. The multiple rows of stitching in both sets 142, 144 may be evenly spaced apart. Alternatively or optionally, the quilted pattern 140 may be an arrangement of any geometric shapes, such as but not limited to squares, rectangles, hexagons, or other polygonal shapes.

Figure 11:
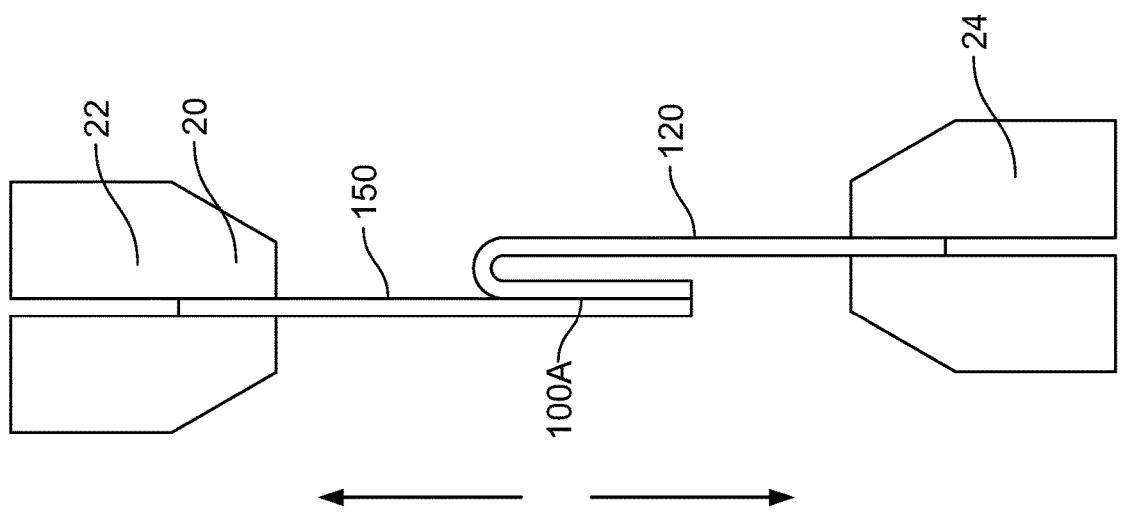
FIG. 11 is a side schematic view of a peel strength test of a portion of the blanket according to one or more aspects described herein.

As described in more detail below, the stitched layered member 150 may be laminated to the base layer 120 such that after the lamination process, the stitched layered member 150 and the base layer 120 may generally move together with little to no separation between the layers when subjected to tensile and/or shear forces pulling on the blanket 100. In other words, the blanket 100 generally moves and functions like a single layer or unitary member while still providing the benefit of the multi-layer construction of a comfortable fabric layer 118 and a waterproof base layer 120. In addition, by combining the stitched layered member 150 with an adhesively joined base layer 120, the overall strength of the blanket 100 is increased. For example, the blanket 100 may have a peel strength, meaning the layers of the blanket 100 do not separate or tear when subjected to a force of approximately 5 kilogram-force (kgf), or a force within a range of 4 kgf and 7 kgf, or under a force within a range of 4 kgf and 10 kgf. To test the peel strength of the blanket 100, a portion of the blanket 100A is pulled using a peel strength test method as described below. FIG. 11 illustrates an exemplary peel strength test method of the blanket 100. To determine the peel strength, a blanket test region 100A is cut from the blanket 100. For example, the blanket test region 100A has a length of approximately 150 mm and a width of approximately 50 mm. A slight delamination at one of the joined edges along one of the 50 mm long edges may be formed to provide enough material to clamp the stitched layered member 150 into an upper jaw 22 of a tensile test machine 20 and to clamp the base layer 120 into a lower jaw 24 of the tensile test machine 20. The peel strength test method may be performed using the tensile test machine 20 to administer a force by moving the upper jaw 22 away from the lower jaw 24 at a predetermined rate. The predetermined rate is generally a constant rate of 100 millimeters per minute (mm/minute). As the jaws 22, 24 are moved away from each other, a strain front may be created along the edge of the blanket test region 100A which causes the layers to slowly separate. The force exerted by the tensile test machine to move the jaws is measured as the layers are separated. The test is completed when the exerted force causes a failure in the blanket test region 100A either in one of the layers 118, 120, 122, 124 of the blanket 100, in the adhesive, or in the stitching such that the failure extends across the entire width of the test region 100A and that the length of the blanket test region 100A has been pulled completely apart. For instance, the length of the sample is approximately 150 mm long so when the test region 100A fails, the jaws 22, 24 may be approximately 300 mm apart. For instance, failure may consist of a tear in one of the layers, a separation of the adhesive between the base layer 120, or some combination of the layers and adhesive failing. Furthermore, the stitching 142, 144 between the layers 118, 120, 122 may fail before the adhesive between the base layer 120 and the stitched layered member 150 fails, while in other embodiments, the adhesive between the base layer 120 and the stitched layered member 150 may fail before the stitching 142, 144 between the layers 118, 120, 122. The peel strength may be determined as the average force recorded during the test to pull the blanket test region 100A to failure.

Figure 12:
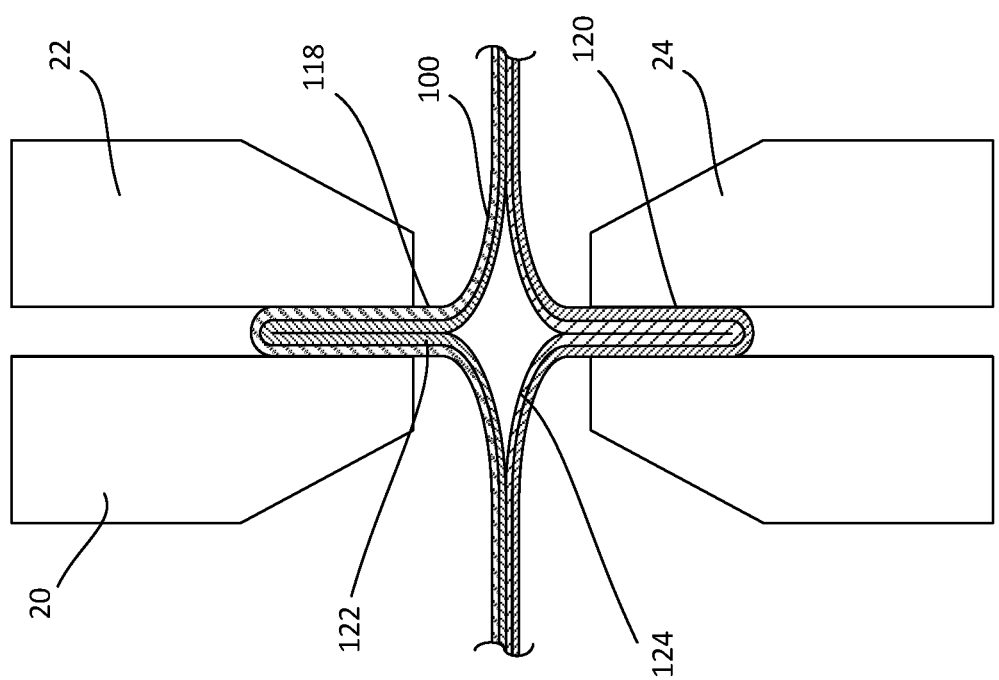
FIG. 12 is a side schematic view of an interlayer strength test of a portion of the blanket according to one or more aspects described herein.

As another example of the strength of the blanket 100 is the blanket's interlayer strength. The blanket may have an interlayer strength of approximately 44 kgf, or within a range of 42 kgf and 46 kgf, or within a range of 40 kgf and 50 kgf. To test the interlayer strength of the blanket 100, the blanket 100 may be pulled to failure using a tensile test machine 20 using an interlayer strength test method as described below. FIG. 12 illustrates an exemplary interlayer strength test of the blanket 100. The portion of the blanket 100 gripped within the jaws 22, 24 may be folded as shown in FIG. 12, such that each jaw 22, 24 pinches a portion of the blanket 100 from opposite sides. The fabric layer 118 may be clamped in an upper jaw 22 and the base layer 120 may be clamped in the lower jaw 24. The tensile test machine 20 may exert a force on the blanket 100 by moving the upper jaw 22 away from the lower jaw 24 at a predetermined rate. The predetermined rate is generally a constant rate of 100 millimeters per minute (mm/minute). As the jaws 22, 24 are moved away from each other, the exerted force required to move the jaws is measured. The upper jaw 22 may grip a plurality of layers of the blanket 100. For example, as shown in FIG. 12, the upper jaw 22 grips both the fabric layer 118 and the insulation layer 122. Additionally, the lower jaw 24 may grip a plurality of layers of the blanket 100. For example, as shown in FIG. 12, the lower jaw 24 grips both the base layer 120 and the scrim layer 124. The jaws 22, 24 may have a width of approximately 63.6 mm and as such the width of the portion of the blanket 100 gripped within the jaws may have the same width of the jaws 22, 24 of approximately 63.6 mm. The portion of the blanket 100 gripped within the jaws 22, 24 may be biased toward a stitched side of one the geometric shapes of the quilted pattern 140. For example, the portion of the blanket 100 gripped within the jaws 22, 24 may be spaced approximately 65 mm from a line of stitching 142, 144 that form the geometric shapes of the quilted pattern 140, where the jaws 22, 24 are oriented generally parallel to one of the rows of stitching 142, 144. The test is completed when the exerted force from the tensile test machine causes a failure in the blanket 100 either in one of the layers 118, 120, 122, 124 of the blanket 100, in the adhesive, or in the stitching such that the failure extends across the entire width of the gripped portion of the blanket 100. For instance, the failure may be that a line of stitching 142, 144 nearest portion of the blanket 100 pinched in the jaws 22, 24 that tears loose. The interlayer strength may be determined as the average force recorded during the test to pull the gripped portion of the blanket 100 to failure.

The blanket 100 may be generally rectangular in shape, but may be any shape such as square, round, elliptical, or other polygonal shape. As in the exemplary embodiment, the top and bottom edges 106, 108 may be longer than the right and left edges 110, 112.

Figure 8:
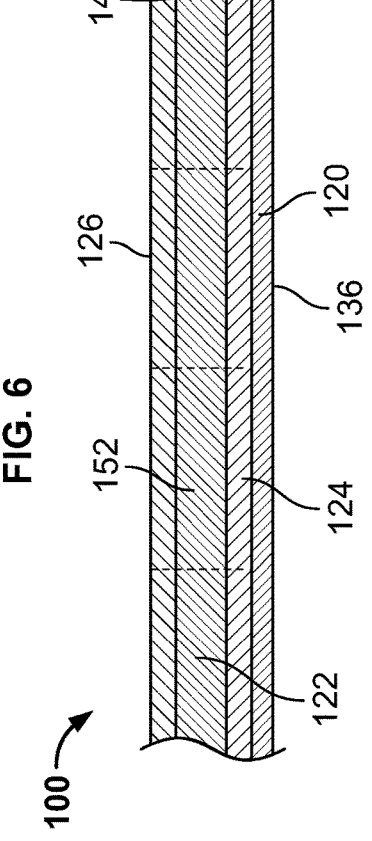
FIG. 8 is a partial cross-sectional view of the blanket of FIG. 7 according to one or more aspects described herein.

In addition, a plurality of utility loops 130 may be attached near the perimeter edges 116 of the blanket 100. The utility loops 130 may be used to attach the blanket to a variety of items, may be used as handles, or may be used in other functions as a user might require. Corner utility loops 130A may be positioned at the corners of the blanket 100 as well as side utility loops 130B may be positioned along the sides. For instance, the exemplary embodiment of blanket 100 shown in FIGS. 1-8 comprises a corner utility loop 130A at each corner and a single side utility loop 130B positioned proximate the center of both the top edge 106 and the bottom edge 108. Alternatively, or optionally, each edge 106, 108, 110, 112 may have multiple utility loops 130 attached, where the utility loops 130 may be evenly spaced along the edges of the blanket 100. Each utility loop 130 may be attached to the blanket 100 between a folded portion of the fabric layer 118 and a folded portion of the base layer 120. Webbing stitching 146 may secure the utility loop 130 to the blanket 100. The stitching 146 may extend through each end 132, 134 of the utility loop as well as through the fabric layer 118 and the base layer 120 as shown in FIG. 8. In addition, the stitching 146 attaching the plurality of utility loop 130 may extend through each layer including the fabric layer 118, the base layer 120, the insulation layer 122, and the adhesive scrim layer 124. The stitching 146 may also be substantially collocated or collinear with the second perimeter stitching 156 that joins the stitched layered member 150 and the base layer 120 that is described in more detail below.

Each utility loop 130 may comprise a webbing, or strap, that is attached to the blanket 100 at a first end 132 and at a second end 134 opposite the first end 132 with a strap portion 133 extending between the first end 132 and the second end 134. Each utility loop 130, both corner utility loops 130A and side utility loops 130B, may extend inwardly a distance equal to or less than 50 mm from the nearest perimeter edge 116 of the blanket 100 when folded onto the base layer 120. The utility loops 130 may have a width within a range of 12.7 mm and 19.1 mm, or within a range of 9.5 mm and 25.4 mm. In addition, the corner utility loops 130A may have a larger width than the side utility loops 130B. As an example, the corner utility loops 130A may have a width of approximately 19.1 mm while the side utility loops 130B may have a width of approximately 12.7 mm. In addition, the utility loops 130 may have a thickness of approximately 1 mm or within a range of 0.5 mm and 2 mm. The utility loops 130 may be formed from a polyester webbing or other types of woven fabric known to one skilled in the art. Alternatively or optionally, the utility loops 130 may comprise any kind of buckle, toggle, snap, button, or other fastening means to enable a user to attach the blanket to a variety of items.

As shown in FIGS. 9A-9D, the blanket 100 may be assembled from multiple layers. First, the fabric layer 118 may be placed on top of the insulation layer 122 with the adhesive mesh "scrim" layer 124 underneath the insulation layer 122 to form a layered member 148. Next, the layered member 148 may be stitched together across its entire surface using a quilted pattern 140 as described above to form a stitched layered member 150. Then, the base layer 120 may be placed with the first side 136 having the waterproof coating facing the exterior surface 126 of the fabric layer 118, such that the orientation of the fabric layer 118 and the base layer 120 is in an inside out configuration of the final blanket 100. The base layer 120 may then may be stitched to the stitched layered member 150 proximate at least three of the perimeter edges to form a blanket sub-assembly 152. This first perimeter stitching 154 proximate the perimeter edges of the blanket sub-assembly 152 may extend through each layer of the stitched layered member 150 at least once as well as the base layer 120 at least once.

After the base layer 120 is stitched to the stitched layered member 150 on at least three sides, the blanket sub-assembly 152 may then be turned from the inside out configuration such that the exterior surface 126 of the fabric layer 118 is exposed as the top surface and the second side 138 of the base layer 120 is exposed as the bottom surface such that the fabric layer 118 and the base layer 120 are in the proper orientation for the blanket 100. The first perimeter stitching 154 may be completed proximate the previously unstitched perimeter edge of the blanket sub-assembly 152. Once in this proper orientation, the blanket sub-assembly 152 may undergo a second stitching process proximate the perimeter edges 116 where the base layer 120 is attached to the stitched layered member 150 using a second perimeter stitching 156 proximate the perimeter of the blanket sub-assembly 152, where the second perimeter stitching 156 may extend through the stitched layered member 150 twice and the base layer 120 twice. For example, a portion of the stitched layered member 150 and a portion of the base layer 120 may be folded inward to allow for the second perimeter stitching 156 to extend through the stitched layered member 150 and the base layer 120 twice as shown in FIG. 9C. Furthermore, this second perimeter stitching 156 may be located inward of the first perimeter stitching 154.

Next, the blanket sub-assembly 152 may be put through a lamination process as known to one skilled in the art that applies both heat and/or heat and pressure across the blanket sub-assembly 160 to activate the adhesive on the adhesive scrim layer 124 to adhere and adhesively attach the first side 136 of the base layer 120 to the adhesive scrim layer 124. The lamination process may comprise placing the blanket sub-assembly 152 across a flat surface and then applying a heated platen onto the entire surface area of the base layer 120. This combination of heat and pressure from the platen may activate the adhesive on the scrim layer 124. Once activated, the adhesive on the scrim layer may form a bond with the waterproof coating of the base layer 120 while also encapsulating the scrim layer 124 within the adhesive. In addition, the adhesive of the scrim layer 124 may also bond with the insulation layer 122. This process helps to unite the blanket 100 to prevent any movement or separation between the layers 118, 120, 122, 124. The platen may only have contact with the base layer 120 of the blanket 100 for a few minutes. The adhesive may then continue to cure for 3 to 7 days, before obtaining maximum strength as the polymer based adhesive cross-links during the curing process. As another option, the heat and pressure may be applied using a lamination process comprising a heated roller moving across the base layer 120. Still as another option, the adhesive on the adhesive scrim layer 124 may be activated using an RF welding technique As discussed above, the blanket 100 may be waterproof such the blanket 100 prevents ingress of water from below even when a weight and profile of an average adult person is placed onto the fabric layer 118 while the base layer 120 is placed onto a wet surface. For instance, the blanket 100 may withstand a hydrostatic pressure of approximately 30 m (30,000 mm) column pressure, or within a range of approximately 30 m (30,000 mm) column pressure or approximately 35 m (35,000 mm) column pressure, or within a range of approximately 20 m (20,000 mm) column pressure or approximately 40 m (40,000 mm) column pressure when tested using under a Mullen Hydrostatic Test method or similar hydrostatic test method per ASTMD751-06 Procedure A or equivalent method.

Figure 10:
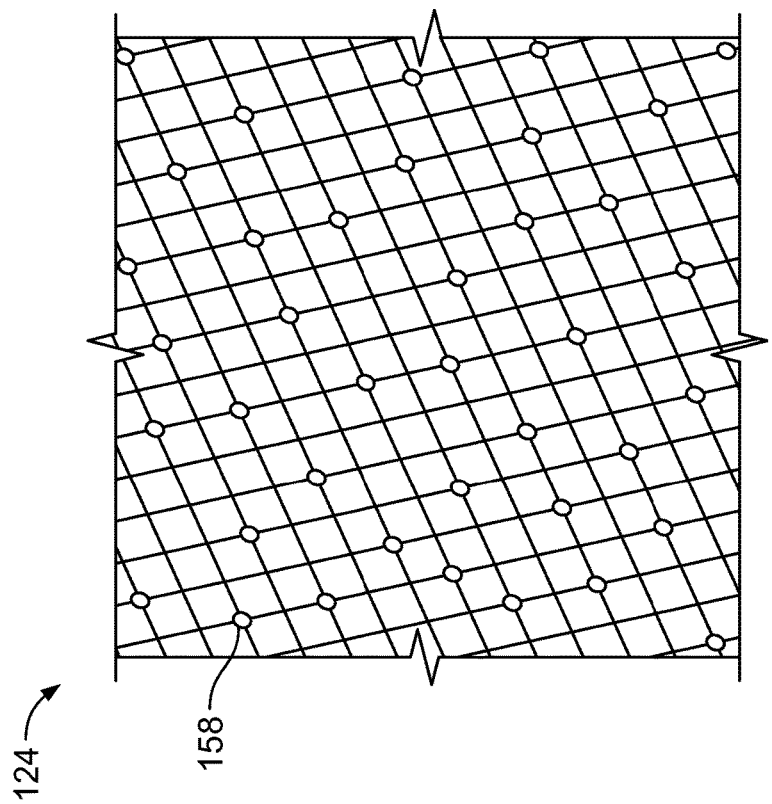
FIG. 10 is a partial enlarged perspective view of one of the layers of the blanket according to one or more aspects described herein.

As described above, the blanket 100 may be formed from multiple layers. For instance, the fabric layer 118 may be formed from a material that provides a soft feel and a sufficient amount of stretch and movement for the blanket 100, such as a polyester rayon spandex twill material, or similar material. The insulation layer 122 may be formed from a material to provide both cushion and insulation, such as a polyester material. The fabric weight of the insulation layer 122 may be approximately 180 grams per square meter (gsm), or within a range of 160 gsm and 200 gsm, or within a range of 100 gsm and 200 gsm, or within a range of 100 gsm and 300 gsm. The adhesive scrim layer 124 may comprise a woven polyester mesh material infused with an adhesive. The adhesive on the scrim layer 124 may be a polymer based adhesive, such as a polyolefin, a thermoplastic polyurethane based adhesive, or other similar adhesive known to one skilled in the art. The adhesive on the scrim layer 124 may be heat activated and may be capable of bonding to both the insulation layer 122 and the base layer 120. While a polymer based adhesive is used on the blanket 100 of the exemplary embodiment, one skilled in the art may choose a different adhesive depending upon the materials of the various layers. Additionally, FIG. 10 illustrates an enlarged portion of the scrim 124 layer. As shown in FIG. 10, the scrim layer 124 may be a mesh like material with the adhesive applied along with mesh in a plurality of locations that may appear as dots, disks, or drops 158 that line the mesh scrim material such that small spaces along the mesh without adhesive are formed. Thus, the adhesive may not cover the entire surface area of the scrim material which may allow the adhesive to flow during the curing process.

The base layer 120 may be formed from a polyester material or similar type material with the waterproof coating on the first side 136. For example, the base layer 120 may be formed from a 600D polyester material, although one skilled in the art may select the proper materials based on the durability and the feel desired to provide for the user. The waterproof coating may be a polyurethane based coating and may be applied using an extrusion lamination process during the manufacturing of the base layer 120. This enhances the waterproof characteristics of the base layer. For instance, the base layer 120 may withstand a hydrostatic pressure of approximately 30 m (30,000 mm) column pressure, or within a range of approximately 30 m (30,000 mm) column pressure or approximately 35 m (35,000 mm) column pressure, or within a range of approximately 20 m (20,000 mm) column pressure or approximately 40 m (40,000 mm) column pressure when tested using under a Mullen Hydrostatic Test method or similar hydrostatic test method per ASTMD751-06 Procedure A or equivalent method.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. A blanket comprising:
    a fabric layer comprising a top edge, a bottom edge opposite the top edge, a left edge extending from the top edge to the bottom edge and a right edge extending from the top edge to the bottom edge opposite the left edge,
    a base layer comprising a waterproof coating connected to the fabric layer,
    a plurality of corner utility loops wherein a first end of each corner utility loop is attached to the fabric layer at a first edge and a second end of each corner utility loop is attached to the fabric layer at a second edge adjacent the first edge,
    at least one side utility loop attached to the fabric layer on at least one side, and
    an insulation layer and an adhesive scrim layer positioned between the fabric layer and the base layer, and
    wherein a stitched layered member is formed by stitching together the insulation layer and the adhesive scrim layer to the fabric layer using a quilted pattern.

2. The blanket of claim 1, wherein the base layer has the waterproof coating on a first side of the base layer, wherein the first side of the base layer is oriented towards the fabric layer.

3. The blanket of claim 1, wherein the quilted pattern is arranged in a diamond pattern.

4. The blanket of claim 3, wherein the base layer is attached to the stitched layered member by an adhesive.

5. The blanket of claim 4, wherein the base layer is further attached to the stitched layered member using a first stitching near a perimeter edge of the blanket, wherein the first stitching extends through the stitched layered member once and the base layer once.

6. The blanket of claim 5, wherein the base layer is further attached to the stitched layered member using a second stitching near the perimeter edge of the blanket, wherein the second stitching extends through the stitched layered member twice and also extends through the base layer twice.

7. The blanket of claim 6, wherein the second stitching is spaced further inward from the perimeter edge of the blanket than the first stitching.

8. The blanket of claim 7, wherein the blanket has a peel strength within a range of 4 kilograms-force and 7 kilograms-force as determined by a peel strength test method, wherein the peel strength test method comprises an upper jaw of a tensile test machine moving away from a lower jaw of the tensile test machine at a rate of 100 millimeters per minute.

9. The blanket of claim 7, wherein the blanket has a waterproof rating within a range of 20,000 mm and 40,000 mm column pressure when tested using a hydrostatic test.

10. The blanket of claim 7, wherein the blanket has an interlayer strength within a range of 42 kilograms-force and 46 kilograms-force as determined by an interlayer strength test method, wherein the interlayer strength test method comprises an upper jaw of a tensile test machine moving away from a lower jaw of the tensile test machine at a rate of 100 millimeters per minute.

11. The blanket of claim 1, wherein at least one corner utility loop of the plurality of corner utility loops is attached between a folded portion of the fabric layer and a folded portion of the base layer.

12. A blanket comprising:
    a fabric layer comprising a top edge, a bottom edge opposite the top edge, a left edge extending from the top edge to the bottom edge and a right edge extending from the top edge to the bottom edge opposite the left edge,
    a base layer comprising a waterproof coating connected to the fabric layer,
    an insulation layer;
    an adhesive scrim layer, wherein the insulation layer and the adhesive scrim layer are positioned between the fabric layer and the base layer, and
    wherein a stitched layered member is formed by stitching together the insulation layer and the adhesive scrim layer to the fabric layer using a quilted pattern.

13. The blanket of claim 12, wherein the base layer has the waterproof coating on a first side of the base layer, wherein the first side of the base layer is oriented towards the fabric layer.

14. The blanket of claim 12, wherein the base layer is attached to the stitched layered member by an adhesive.

15. The blanket of claim 14, wherein the base layer is further attached to the stitched layered member using a first stitching near a perimeter edge of the blanket, wherein the first stitching extends through the stitched layered member once and the base layer once.

16. The blanket of claim 15, wherein the base layer is further attached to the stitched layered member using a second stitching near the perimeter edge of the blanket, wherein the second stitching extends through the stitched layered member twice and also extends through the base layer twice.

17. The blanket of claim 16, wherein the second stitching is spaced further inward from the perimeter edge of the blanket than the first stitching.

18. The blanket of claim 17, wherein the blanket has a peel strength within a range of 4 kilograms-force and 7 kilograms-force as determined by a peel strength test method, wherein the peel strength test method comprises an upper jaw of a tensile test machine moving away from a lower jaw of the tensile test machine at a rate of 100 millimeters per minute.

19. The blanket of claim 17, wherein the blanket has a waterproof rating within a range of 20,000 mm and 40,000 mm column pressure when tested using a hydrostatic test.

20. The blanket of claim 17, wherein the blanket has an interlayer strength within a range of 42 kilograms-force and 46 kilograms-force as determined by an interlayer strength test method, wherein the interlayer strength test method comprises an upper jaw of a tensile test machine moving away from a lower jaw of the tensile test machine at a rate of 100 millimeters per minute.

\* \* \* \* \*